United States Patent [19]

Finelli

[11] 4,036,906
[45] July 19, 1977

[54] CURED POLYURETHANE COMPOSITIONS CONTAINING EPOXY RESINS

[75] Inventor: Anthony F. Finelli, Akron, Ohio

[73] Assignee: The Goodyear Tire & Rubber Company, Akron, Ohio

[21] Appl. No.: 561,122

[22] Filed: Mar. 24, 1975

Related U.S. Application Data

[63] Continuation of Ser. No. 390,831, Aug. 23, 1973, abandoned, which is a continuation of Ser. No. 207,976, Nov. 24, 1971, abandoned, which is a continuation of Ser. No. 889,300, Dec. 30, 1969, abandoned.

[51] Int. Cl.$^2$ ............................................. C08L 63/00
[52] U.S. Cl. .................................. 260/830 P; 260/835
[58] Field of Search ........................... 260/830 P, 835

[56] References Cited

U.S. PATENT DOCUMENTS

| 3,158,586 | 11/1964 | Krause | 260/830 P |
| 3,426,097 | 2/1969 | Ilkka et al. | 260/830 P |
| 3,440,086 | 4/1969 | Kerns | 260/835 |
| 3,510,439 | 3/1970 | Kaltenbach et al. | 260/830 P |
| 3,546,064 | 12/1970 | Hamilton et al. | 260/835 |
| 3,558,408 | 1/1971 | Hamilton et al. | 260/830 P |
| 3,558,422 | 1/1971 | Hamilton et al. | 260/830 P |
| 3,565,972 | 2/1971 | Harris | 260/830 P |

*Primary Examiner*—J. Ziegler
*Attorney, Agent, or Firm*—F. W. Brunner; H. C. Young, Jr.

[57] ABSTRACT

Cured polyurethane composition characterized by resistance to hydrolysis degradation prepared by reacting a polyurethane reaction mixture containing sufficient diamine curative in the presence of an excess of an epoxy resin.

3 Claims, No Drawings

CURED POLYURETHANE COMPOSITIONS CONTAINING EPOXY RESINS

This application is a continuation of application Ser. No. 390,831, filed Aug. 23, 1973, now abandoned, which was a continuation of application Ser. No. 207,976, filed Nov. 24, 1971, now abandoned, which was a continuation of application Ser. No. 889,300, filed Dec. 30, 1969, now abandoned.

This invention relates to cured polyurethane compositions having improved resistance to hydrolysis and to laminates thereof.

Various polyurethane compositions, particularly elastomers, have been known and used for many year. However, the poor hydrolysis resistance of various polyurethanes, particularly the polyesterurethane elastomers, have greatly limited their commercial use, especially where the polyurethane compositions are used in a hot and humit atmosphere.

Therefore, it is an object of this invention to provide a polyurethane composition having improved hydrolysis resistance particularly in hot and humid atmospheres.

In accordance with this invention it has been discovered that a polyurethane composition having improved resistance to hydrolysis is prepared by the method which comprises reacting in the presence of an epoxy resin an organic polyisocyanate, a reactive hydrogen-containing polymeric material having a molecular weight in the range of from about 700 to about 5000, at least one curative selected from diamines having primary amino groups and hydroxyl terminated hydrocarbons having from 2 to 6 carbon atoms, preferably diols, where the ratio of the isocyanato groups of the polyisocyanate to the reactive hydrogens of the reactive hydrogen-containing polymeric material is from about 1.1/1 to about 3.5/1, the ratio of amino groups and hydroxyl groups of the curative to isocyanato groups in excess of the reactive hydrogens of the reactive hydrogen-containing polymeric material is from about 0.5/1 to about 1.1/1 and where the said polyurethane composition contains from about 1 to about 15 weight percent and preferably from about 2 to about 5 weight percent of the epoxy resin, and at least sufficient to give an excess of epoxide groups relative to the total excess of the said amino groups and hydroxyl groups of the curative over the said excess isocyanato groups.

Thus, an excess of epoxide groups is required over the excess amino and/or hydroxyl groups of the curative, such as at least about 5 to about 50 equivalent percent excess, based on two epoxy groups per amino (—$NH_2$) group, to provide a polyurethane composition containing sufficient free epoxide groups.

The cured polyurethane can be prepared by the various well-known methods in the presence of the epoxy resins. The epoxy resin can be mixed with the polyisocyanate, the reactive hydrogen-containing polymeric material, their reaction product sometimes known as a prepolymer, preferably isocyanate terminated, or even the curative or a mixture of all of these materials providing that the curative is mixed in the presence of the epoxy resin very shortly before preparing the polyurethane composition.

It is typically preferred that the cured polyurethane composition is prepared by the method which comprises (a) preparing an isocyanate terminated polyurethane prepolymer by reacting the organic polyisocyanate with the reactive hydrogen-containing polymeric material, and (b) curing a mixture containing the said prepolymer, the said epoxy resin and the said curative.

It was discovered that the polyurethane compositions of this invention, particularly such polyesterurethane compositions, are resistant to water hydrolysis when immersed in distilled water at 158° F. for 14 days.

In the practice of this invention, although it is possible to prepare the polyurethane composition in the absence of solvents, it is generally preferred that the composition is prepared by mixing in solution a polyurethane prepolymer, the epoxy resin, and curative, and then substantially simultaneously removing the solvent from the mixture and curing the polyurethane.

The polyurethane reaction mixtures used in this invention are typically liquid mixtures commonly used to prepare polyurethanes, and particularly flexible polyurethanes, by the well-known 1-shot, prepolymer or semi-prepolymer techniques. The materials are typically reacted at temperatures from about 20° C. to about 150° C., and usually from about 20° C. to about 100° C.

Generally, the polyurethane reaction mixtures are prepared from at least one reactive hydrogen containing polymeric material as determined by the Zerewitinoff method, at least one organic polyisocyanate with the epoxy resin and curative. It is to be understood that the polyurethanes referred to in this specification may also contain polyurea linkages. A solvent can be used with the reaction mixture to facilitate its use in the form of a fluid mixture or solution although it is preferred to use the reaction mixture with only a minor amount of solvent, if any. If solvent is used, it can be added to form a mixture containing from about 40 to about 95 percent solids. However, a higher or lower concentration of solids can be used. When the solids concentration is low, the individual applications will deposit a thin layer of the polyurethane polymer, and a large amount of the solvent will have to be removed during the curing process. A solids concentration of 45 percent or higher is generally desired, if a solvent is used.

Other methods known to those skilled in the art of preparing polyurethane reaction mixtures with or without solvents being present may also be used.

A catalyst or accelerator can be used to facilitate the reaction which results in substantially reduced set-up time, and thus enhances the thixotropic properties of the polyurethane mixture. Well-known polyurethane catalysts are useful for this purpose such as tertiary amines and the tin salts of fatty acids and also accelerators such as mercaptobenzothiazole.

The reactive hydrogen-containing polymeric material used typically comprises at least one member selected from the group consisting of polyester polyols, polyether polyols, castor oil and hydroxyl terminated unsaturated polymeric polyols. The hydroxyl terminated unsaturated polymeric polyols typically have a molecular weight of from about 2000 to about 4000 and a hydroxyl functionality of from about 2 to about 3. The reactive hydrogen-containing material generally used, other than the hydroxyl terminated unsaturated polymeric polyol, has a molecular weight in the range of from about 700 to about 5000, and usually from about 1000 to about 3000. (If the molecular weight of the reactive hydrogen-containing material is too low, the polyurethane will not have sufficient elasticity). Generally, the polyester polyols are the preferred active hydrogen-containing material where high strength and solvent resistance are desired.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid, and azelaic acid. The anhydrides of such acids can be used in place of the acid. If desired, from about one to 20 percent by weight of a triol or higher polyfunctional polyol or polyfunctional acid can be present to produce branching in the polyurethane polymer.

Polyether polyols useful in preparing the polyurethanes of this invention can be prepared by polymerizing or copolymerizing alkylene oxides such as ethylene oxide, propylene oxide, and butylene oxides, by polymerizing or copolymerizing the low molecular weight glycols, or by the reaction of one or more such alkylene oxides with the glycols or with triol, or with a polycarboxylic acid such as phthalic acid. The polyether polyols include polyalkylene-aryl ether glycols or triols, polytetramethylene ether glycols, polyalkylene ether-thioether glycols or triols and alkyd resins. Generally the polytetramethylene ether glycols are the preferred polyether glycols.

It is usually preferred that the hydroxyl-terminated unsaturated polymeric polyol has a molecular weight of from about 2000 to about 4000 and a corresponding hydroxyl number of from about 50 to about 25. The hydroxyl terminated unsaturated polymeric polyols used in this invention are unsaturated polymers of the type prepared by polymerizing unsaturated monomers comprising from about 70 to about 100 percent conjugated dienes selected from the group consisting of 1,3-butadiene and isoprene and up to about 30 percent styrene with the aid of organic peroxy catalysts to provide polymers which are generally terminated at both ends of their chain with hydroxyl groups and have a hydroxyl functionality of from about 2 to about 3 and usually from about 2.1 to about 2.8. The preferred hydroxyl containing polymeric polyols are polybutadiene polyols, polyisoprene polyols, butadiene-styrene copolymer polyols having about 80 to 90 percent units derived from butadiene and about 20 to 10 percent units derived from styrene and also butadiene-acrylonitrile copolymer polyols.

The orgainic polyisocyanates used in this invention include various organic diisocyanates and mixtures thereof. The organic polyisocyanates can be aromatic, aliphatic or cycloaliphatic or combinations of these types.

Representative examples of such polyisocyanates include the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene-bis(cyclohexylisocyanate) and 1,5-tetrahydronaphthalene diisocyanate, and mixtures of such diisocyanates. For the purpose of the present invention, the toluene-diisocyanates, diphenylmethane-4,4'-diisocyanate, 3,3'-dimethyl-4,4'-bisphenylene diisocyanate and 4,4'-methylene bis(cyclohexyl isocyanate) are preferred. For convenience, these diisocyanates are referred to as TDI, MDI, TODI and $H_{12}MDI$, respectively.

The curatives promote chain extension and crosslinking of the polyurethane polymer. Bifunctional materials such as glycols and diamines are generally preferred as chain extending and crosslinking agents. Representative examples of such curatives are ethylene glycol, 1,3-propanediol, 1,4-butanediol, 1,5-pentanediol, 1,6-hexanediol and glycerol; aliphatic diamines such as ethylene diamine, trimethylene diamine, 1,4-cyclohexane bis(methylamine), [3,5,5-trimethyl-3-aminomethyl cyclohexylamine], and tetramethylene diamine; aromatic diamines such as m-phenylene diamine, o- and m-dichlorobenzidine, 2,5-dichlorophenylene diamine, 3,3'-dichloro-4,4'-diamino-diphenyl methane, dianisidine, 4,4'-diamino-diphenyl methane, the napthylene diamines, tolylene-2,4-diamine, p-aminobenzyl aniline, and 0- and p-aminodiphenyl-amine; hydroxy amines such as triethanol amine, 2-amino-ethyl alcohol, 2-amino-1-naphthol and m-aminophenol; hydroxy carboxylic acids such as glycolic acid and alpha-hyrdoxy propionic acid; and amino carboxylic acids such as amino acetic acid and amino benzoic acid. The preferred crosslinking agents are 1,4-butane diol, the chloroamines such as ortho-dichlorobenzidine and methylene bis orthochloroaniline, the latter chloroamines above are sometimes referred to herein for convenience as ODCB and MOCA, respectively. Preferred aliphatic diamines are 1,4-cyclohexane bis(methylamine) and 3,5,5-trimethyl-3-aminomethyl cyclohexylamine. The latter diamines are sometimes referred to as CHMA and IPD.

Various nonreactive solvents known to those skilled in the polyurethane art can be used for the preparation of the prepolymer solutions and polyurethane reaction mixtures, if a solvent is desired. Representative examples of the solvents are aromatic solvents such as benzene, xylene and toluene; and the liquid lower ketones such as acetone, methyl ethyl ketone, methyl isobutyl ketone, and diisobutyl ketone. If the polyurethane reaction mixtures are to be used to prepare the cured polyurethanes in confined areas which are subject to explosive hazards, nonflammable chlorinated solvents can be used to form nonflammable polyurethane reaction mixtures. Mixtures of solvents may also be used to obtain satisfactory spreading properties and evaporation rates when the polyurethane spray composition is applied to a polymeic surface.

If desired, pigments, surface-active agents, leveling agents, such as cellulose acetate butyarate, and other additives can be added. When a pigment is added, it as added in an amount from about 0.5 to 10 parts and, preferably usually in the amount from about one to two parts of pigment per hundred parts of prepolymer by weight.

A unique polyurethane composition can be prepared by the method which comprises reacting from about 1.5 to about 1.7 mols of an organic diisocyanate selected from at least one of the group consisting of toluene diisocyanate, 4,4'-diphenylmethane-diisocyanate and 4,4'-dicyclohexylmethane diisocyanate with a mixture comprising the epoxy resin, from about 0.4 to about 0.6 moles of a hydrocarbon diol additive having from 2 to about 6 carbon atoms and having terminal hydroxyl groups, from about 0.03 to about 0.05 moles of a diamino diphenyl sulfone, and 1.0 moles of a polymeric polyester condensation reaction product of a dicarboxylic acid selected from adipic acid, azaleic acid and their anhydrides and a saturated hydrocarbon diol having terminal hydroxyl groups selected from diols having from two to six carbon atoms where the polyester has a molecular weight of from about 700 to about 2500 and an acid number of less than about 10, wherein the isocyanato groups of the diisocyanate are equal to from about 92 to about 97 percent of the total reactive hydrogens supplied by the polymeric polyester, the hydrocarbon diol additive, and the diamino diphenyl sulfone, and curing the reaction mixture.

The preparation of such polyurethanes without the epoxy resin additive has been described in the patent literature.

In the preparation of these said unique polyurethane compositions, it is usually preferable to adjust the ratio of the reactants so that the isocyanato groups of the diisocyanate are equal to from about 94 to about 97 percent and more preferably from about 94 to about 96 percent of the total reactive hydrogens supplied by the polymeric polyester, the hydrocarbon diol, and the diamino diphenyl sulfone. The reactive hydrogens are supplied by hydroxyl groups and amino groups. It is an important feature that in addition to reacting certain amounts of certain materials, a particular order of addition is important in that it is preferred that first a mixture is prepared of the polyester, hydrocarbon diol, and the sulfone dimaine and then the organic diisocyanate is added to the mixture. The diamine curatives are diamino diphenyl sulfones. Representative of such sulfones are 4,4'-diamino diphenyl sulfone and 3,3'-diamino diphenyl sulfone. The diisocyanates include mixtures of toluene diisocyanate and with up to about 90 weight percent diisocyanates selected from 4,4'-diphenylmethane diisocyanate and 4,4'-dicyclohexylmethane diisocyanate.

Toluene diisocyanate commonly exists in 2,4 and 2,6-substituted toluene forms. Thus, in this specification 2,4-toluene diisocyanate and 2,6-toluene diisocyanate and their mixtures are generally simply referred to as toluene diisocyanates. If a mixture is used, it is usually preferred to use a mole ratio of from about 70/30 to about 90/10 of 2,4-toluene diisocyanate to 2,6-toluene diisocyanate.

Typical epoxy resin compounds are used in this invention and are well known to those skilled in the epoxy resin art. The general characteristic of this class of material is the presence of epoxy groups, which are of the formula

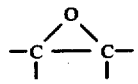

Ordinarily, epoxy resins contain a plurality of terminal epoxy groups. Usually epoxy resins are of moderately high molecular weight, containing more than 10, and usually more than 20 carbon atoms per molecule, although in this invention epoxy compounds containing fewer carbons may be used.

The epoxy group content of such resins is usually expressed as the epoxide equivalent, or grams of resin containing a gram equivalent of epoxide. The equivalent of a commercial resin is generally expressed as a range, such as 125-175, 150-200, etc. Epoxy resins having low epoxide equivalents, in the range of from about 125 to about 250, are usually preferred because of their lower viscosity, although higher equivalents, including 125 to about 525 with melting points up to about 75° C., offer advantages where viscosity is not a factor.

Epoxy resins are typically prepared by reaction of a polyfunctional epoxy compound with a compound containing two or more hydroxy radicals, producing epoxy resins comprising one or more ether linkages, joining organic radicals and terminating in epoxy groups.

The members of a preferred class of epoxy resins for use in the process of this invention are the products of reactions of polyfunctional epoxy compounds with aromatic polyhydric phenolic compounds. The polyfunctional epoxy compound used in this connection may be a diepoxide, distinguished from the class of epoxy resins by its relatively low molecular weight, illustrative of which are diepoxybutadiene, and bis(2,3-epoxy-2-metylproply) ether. More usually, the polyfunctional epoxy compound is a haloepoxy compound, most commonly, epichlorhydrin. Reaction of epichlorhydrin, for example, with an aromatic polyhrdric phenolic compound results in the formation of a polymer containing ether linkages between arylene radicals derived from the initial aromatic polyhydric compound and hydroxy-alkylene radicals derived from the initial haloephoxy compound, the polymers terminating in epoxyalkyl radicals. The aromatic polyhydric compound may comprise a monocyclic phenol such as a resorcinol, a polycyclic phenol such as $p,p^1$-(dihydroxy)-bisphenol, or phenolic resin such as a phenol-formaldehyde resin. In particular, there are preferred in the process of this invention, epoxy resins derived from the reaction of epichlorohydrin and bisphenols. Illustrative of various suitable bisphenols are, for example, $p,p^1$-oxybisphenol, $p,p^1$-methylene bisphenol, 2,2-bis(4-hydroxyphenol)propane, 2,2-bis(4-hydroxy-2-methylphenyl)propane, 2,2-bis(2-t-butyl-4-hydroxyphenyl)propane, 2,2-bis(2,5-dimethyl-4-hydroxyphenyl) propane, 2,2-bis(2-chloro-4-hydroxyphenyl)propane, 2,2-bis (2-bromo-6-fluoro-4-hydroxyphenyl)propane, 1,1-bis(4-hydroxyphenyl)ethane, 1,1-bis(4-hydroxyphenyl)isobutane, 1,1-bis (2-isopropyl-4-hydroxyphenyl)isobutane, 2,2-bis(4-hydroxyphenyl) butane, 4,4-bis(4-hydroxyphenyl)heptane, 1,1-bis(4-hydroxyphenyl) dodecane, and 2,2-bis(4-hydroxyphenyl)hexadecane.

Preferred resins for this invention are derived from epichlorhydrin and 2,2-bis(4-hydroxyphenol) propane with an epoxide equivalency of about 150 to about 220, preferably about 175 to about 210. Resins which are pourable liquids at about 25° C. are preferred but others can be used in solution. Typical resins are those obtainable under the tradenames Epon 828 and Epon 1001 from the Shell Chemical Company.

Another class of epoxy resins commercially available and useful in the present process comprises aliphatic epoxy resins. Compounds of this nature may, for example, be prepared by a process analogous to that employed in preparing an epoxy resin from a bis-phenol, with the substitution of an aliphatic polyol for the aromatic hydroxy compound. As illustrative of epoxy resins of this class may be mentioned reaction products of an epoxy group source such as epichlorohydrin with aliphatic polyols such as triethylene glycol, 1,4-butylene glycol, hexamethylene glycol, octaethylene glycol, glycerol, and sorbitol.

A specific class of epoxy resins useful in this invention are the allyl glycidyl ether polymers of varying molecular weights.

Epoxy groups can be introduced into organic molecules by treatment of an aliphatic double bond with an appropriate oxidizing agent. Examples of epoxy compounds of this nature are the epoxidized polydienes such as epoxidized polybutadiene, epoxidized polyisoprene, epoxidized polypiperylene, epoxidized fats and oils such as soybean oil, etc. The above epoxidized compounds can and frequently do contain more than two epoxy groups per molecule. For example, the number of epoxy groups can vary from a single epoxy group to 2 to 5 or even up to 10 or more per molecule.

Further illustrative examples of suitable epoxy resins and methods of preparation may be found in U.S. Pat. No. 3,350,406.

The practice of this invention is further illustrated by reference to the following examples which are intended to be representative rather than restrictive of the scope of the invention. Unless otherwise indicated, all parts and percentages are by weight.

EXAMPLE I

A polyurethane prepolymer was prepared by reacting one mole of diethylene adipate having a molecular weight of about 1000 with two moles of a mixture of 2,4- and 2,6-tolylene diisocyanates in a 80/20 mole ratio, respectively. One hundred parts of the prepared prepolymer was diluted by mixing with a mixture of 30 parts toluene, 30 parts methyl ethyl ketone, and 5 parts of a 10 percent cellulose acetate butyrate in Cellosolve acetate, a trademark for ethylene glycol monoethylether acetate by the Union Carbide Corporation. The diluted prepolymer was analyzed and found to have a 3.6 percent NCO group content (isocyanate content). The NCO group content is the grams of NCO groups per 100 grams of sample, or in this case, the diluted prepolymer.

To 50 parts of the diluted prepolymer was added (a) 6 parts of a white epoxy dispersion obtainable as White 2100 Epoxy Dispersion from Pigment Dispersions, Inc. and containing a 60/40 weight ratio of titanium dioxide in liquid Epon resin 828, and (b) a curative mixture prepared by mixing 5 parts of 4,4'-methylene bis(2-chloroaniline), 0.5 part 2-mercaptobenzothiazole, and 10 parts methyl ethyl ketone. The Epon 828 was a pourable liquid eqoxy resin having a viscosity in the range of from about 50 to about 150 poises at 25° C., a melting point in the range of about 8° C. to about 15° C., an an epoxide equivalency in the range of from about 175 to about 210 formed by the reaction of 4,4'-dihydroxy diphenyl propane and epichlorohydrin in about a 1:2 molar ratio obtainable from the Shell Chemical Corporation.

Films of the reaction mixture were drawn on polyethylene slabs and allowed to cure at about 25° C. for about 24 hours to form white cured polyurethane films.

Similarly, clear, cured polyurethane films were also prepared by mixing with the diluted prepolymer, the curative mixture without the white epoxy dispersion. Another white, cured polyurethane film was prepared by adding to 50 parts of the diluted prepolymer 6 parts of a white dispersion of a 60/40 weight ratio of titanium dioxide in a polyester plasticizer and the curative mixture. The polyester plasticizer was an adipate polyester based vehicle obtained as 3100 P from Pigmen Dispersion, Inc.

The cured polyurethane films containing the epoxy resin showed an improved resistance to hydrolysis as exhibited in Table 1, the first, second and third columns showing the results on the cured polyurethane films containing no epoxy resin, such films containing a white pigment and such films containing white pigment and epoxy resin. The resistance to hydrolysis is shown by the substantial retention of tensile strength in pounds per square inch and percent elongatiion after 14 days immersion in water at 158° F. The tensile and elongation were determined at about 25° C. by methods normally used by those skilled in the art.

Table 1

| Original | Clear (Without Epoxy Resin) | White Polyester Dispersion | White Epoxy Dispersion |
|---|---|---|---|
| Tensile (PSI) | 4500 | 3500 | 3700 |
| Elong (%) | 525 | 500 | 470 |
| Thickness (inch) | 0.040 | 0.030 | 0.015 |
| After 14 days in H₂O at 158° F. (measured wet) | | | |
| Tensile (PSI) | 1000 | 800 | 2200 |
| Elong (%) | 300 | 110 | 510 |

EXAMPLE II

A polyurethane prepolymer was prepared by reacting one mole of ethylene adipate having a molecular weight of about 1000 with two moles of a mixture of 2,4- and 2,6-tolylene diisocyanates having an 80/20 mole ratio respectively. The prepolymer was analyzed to have 6 percent NCO content and was diluted as in Example I. The diluted prepolymer was analyzed to have a 3.7 percent NCO content.

To 50 parts of the diluted prepolymer was mixed (a) 6 parts of white dispersion of a 60/40 weight ratio of titanium dioxide in liquid Epon Resin 828 and (b) 15.5 parts of the curative mixture used in Example I, at about 25° C. to form a polyurethane reaction mixture. Films of the reaction mixture were drawn on polyethylene slabs and allowed to sure at about 25° C. for about 24 hours to form white cured polyurethane films.

Similaryly, clear cured polyurethanes were also prepared by mixing the curative mixture with the diluted prepolymer and curing. Additional white cured polyurethane films were prepared by mixing the diluted prepolymer with a white dispersion of a 60/40 weight ratio of titanium dioxide in the polyester adipate plasticizer and the curative mixing and curing as in Example I.

The cured polyurethane films containing epoxy resin showed a substantially improved resistance to hydrolysis as exhibited in Table 2. The resistance to hydrolysis is shown by the substantial retention of tensile and elongation after 14 days immersion in water at 158° F.

Table 2

| Original | Clear (Without Epoxy resin) | White Polyester Dispersion | White Epoxy Dispersion |
|---|---|---|---|
| Tensile (PSI) | 4700 | 4700 | 5600 |
| Elong (%) | 470 | 510 | 490 |
| After 14 days in H₂O at 158° F. (measured wet) | | | |
| Tensile (PSI) | 1700 | 1200 | 3400 |
| Elong (%) | 560 | 270 | 520 |

EXAMPLE III

A polyurethane prepolymer was prepared by reacting one mole of tetramethylene azelate having a molecular weight of about 1000 with 2 moles of a mixture of 2,4- and 2,6-tolylene diisocyanates having a 80/20 mole ratio respectively. One hundred parts of the prepolymer was diluted with 50 parts toluene and 50 parts of methyl ethyl ketone. The diluted prepolymer was analyzed and found to have a 3.1 percent NCO content.

To 100 parts of the diluted prepolymer at about 25° C. was added (a) a mixture of 12 parts of a carbon black dispersion in liquid Epon resin 828 and 12 parts methyl ethyl ketone and (b) a curative mix to form a polyurethane reaction mixture. The carbon black dispersion contained 15 weight percent carbon black The carbon black was an oil furnace coloring black.

The curative mixture was prepared by mixing 8.5 parts 4,4'-methylene bis(2-chloroaniline), 0.5 part 2-mercaptobenzothiazole, 0.5 part p-methoxyphenol and 18 parts methyl ethyl ketone.

Films were drawn from the reaction mixture on polyethylene slabs and allowed to cure at about 25° C. for about 24 hours. Films were also drawn from the polyurethane reaction mixture (diluted prepolymer plus curative mixture) without the addition of the carbon black dispersion.

A portion of each drawn film was submitted to a steam autoclave test at 240° F. for 10 hours. As shown in Table 3, the cured polyurethane containing the epoxy resin exhibited a substantially improved resistance to the test.

Table 3

| Original | Clear (Without Epoxy Resin) | Carbon Black Epoxy Dispersion |
|---|---|---|
| Tensile (PSI) | 6600 | 5000 |
| Elong (%) | 420 | 460 |
| 100% Modulus (PSI) | 1100 | 800 |
| After 10 hrs/240° F. in steam autoclave | | |
| Tensile (PSI) | 1400 | 3800 |
| Elong (%) | 440 | 415 |

The drawn films of polyurethane were also submitted to oven aging by immersing in water at 158° F. for various periods of time. As shown in Table 4, the cured polyurethanes containing the epoxy resin exhibited a substantially greater resistance to hydrolysis over a period of time in this test.

Table 4

| | | Clear (without) Epoxy Resin) | Carbon Black- Epoxy Resin Dispersion |
|---|---|---|---|
| After 14 days in H₂O at 158° F. (measured wet) | Tensile | 3700 | 3200 |
| | Elong. | 440 | 450 |
| After 28 days in H₂O at 158° F. | Tensile | 2800 | 3100 |
| | Elong. | 480 | 360 |
| After 42 days in H₂O at 158° F. | Tensile | 2100 | 4500 |
| | Elong. | 460 | 370 |

EXAMPLE IV

A polyurethane prepolymer of one mole tetramethylene adipate (1000 m.w.), and two moles tolylene (toluene) diisocyanate was prepared according to the method of Example T. The diluted prepolymer was found to have a 3.3 percent NCO content.

To 100 parts of the diluted prepolymer was mixed 12 parts of a dispersion of liquid Epon Resin 828 and carbon black in 85/15 weight ratio. The carbon black was on oil furnace coloring black.

A curative mixture was prepared by mixing 9.5 parts 4,4'-methylene bis(2-chloroaniline), 1 part 2-mercaptobenzothiazole, and 20 parts of methyl ethyl ketone and added to the diluted prepolymer containing the carbon black-epoxy resin dispersion to form a polyurethane reaction mixture at about 25° C.

Films were drawn from the reaction mixture containing carbon black and epoxy resin on polyethylene slabs and allowed to cure at about 25° C. for about 24 hours.

Clear films were also drawn of the reaction mixture without the addition of carbon black and epoxy resin and similarly cured at about 25° C. for about 24 hours.

A portion of each film was submitted to a steam autoclave test at 240° F. for 10 hours and also to oven aging by immersion in water at 158° F. for 60 days. As shown by Table 5, the cured polyurethane containing both carbon black and the epoxy resin showed considerably more substantial retention of its physical properties in all the tests. The clear film in the overn aging test lost its rubbery properties while the film containing the carbon black-epoxy resin dispersion retained its rubbery properties.

Table 5

| Original | Clear (Without Epoxy Resin) | Carbon Black- Epoxy Resin |
|---|---|---|
| Tensile (PSI) | 4500 | 6500 |
| Elong. (%) | 330 | 450 |
| Thickness (inch) | 0.036 | 0.024 |
| Smear Point (° F) | 411 | 403 |
| After 10 hrs/240° F. in steam autoclave | | |
| Tensile (PSI) | 900 | 5200 |
| Elong. (%) | 430 | 440 |
| Smear Point (° F) | 134 | 369 |
| After 60 days in H₂O at 158° F. | | |
| Tensile (PSI) | 600 | 3500 |
| Elong. (%) | 50 | 280 |

EXAMPLE V

A prepolymer of one mole polytetramethylene ether glycol (1000 m.w.) and two moles tolylene diisocyanate was prepared according to Example I and 100 parts diluted with 35 parts toluene and 30 parts methyl ethyl ketone to a 3.6 percent NCO content.

To 100 parts of the diluted prepolymer was mixed (a) 20 parts of a dispersion of red pigment and liquid Epon Resin 828 containing 60 percent by weight of the pigment and (b) a curative mixture at about 25° C. to form a polyurethane reaction mixture. The curative mixture was prepared by mixing 9.8 parts 4,4'-methylene bis(2-chloroaniline), 1.4 parts Santowhite powder antioxidant, a trademark of the Monsanto Chemical Company, and 15 parts methyl ethyl ketone. The red pigment-epoxy resin dispersion was obtainable as Red 2501 Epoxy Dispersion from Pigment Dispersions, Inc.

Films were drawn of the reaction mixture on polyethylene slabs and cured at about 25° C. for about 24 hours to form red cured epoxy resin containing polyurethane films. Similarly clear films of the cured polyurethane were prepared without the red pigment epoxy resin dispersion.

The films were submitted to a steam autoclave test at 240° F. for 10 hours. The red pigment-epoxy resin containing polyurethane film showed good rubbery properties while the clear film lost most of its tensile strength as shown in Table 6.

Table 6

| Original | Clear (Without Epoxy Resin) | Red Pigment- Epoxy Resin Dispersion |
|---|---|---|
| Tensile (PSI) | 5100 | 4600 |
| Elong. (%) | 320 | 425 |

Table 6-continued

| Original | Clear (Without Epoxy Resin) | Red Pigment-Epoxy Resin Dispersion |
|---|---|---|
| Thickness (inch) | 0.024 | 0.026 |
| After 10 hrs/240° F. Steam autoclave | | |
| Tensile (PSI) | 900 | 3000 |
| Elong. (%) | 625 | 340 |

EXAMPLE VI

A polyurethane prepolymer was prepared by reacting 1000 parts of tetramethylene adipate having a molecular weight of about 1000 and 530 parts of 4,4'-dicyclohexylmethane diisocyanate. The prepolymer was diluted with toluene to form a diluted prepolymer having a 2.6 percent NCO content.

To 100 parts of the diluted prepolymer was mixed (a) 10 parts of a white dispersion of titanium dioxide and Epon Resin 828 in a 60/40 weight ratio (White 2100), slurried in 10 parts of methyl etyl ketone and (b) 23.6 parts of a curative mixture at about 25° C. to form a polyurethane reaction mixture. The curative mixture was prepared by mixing 100 parts of isophorone diamine and 400 parts of methyl isobutyl ketone and aging for about 48 hours at about 25° C.

Films were drawn of the reaction mixture on a polyethylene slab and allowed to cure at about 25° C. for about 24 hours to form white cured polyurethane films. Similarly, clear cured polyurethane films were prepared without the titanium dioxide-epoxy resin dispersion.

The films were subjected to long term aging tests by immersion in water at 158° F. As shown in Table 7, the cured polyurethane containing the white-epoxy resin dispersion exhibited good retention of its physical properties. The clear film lost its rubbery properties in 60 days while the white film showed excellent rubbery properties even after 90 days.

Table 7

| Original | Clear (Without Epoxy Resin) | White Epoxy Dispersion |
|---|---|---|
| Tensile (PSI) | 5300 | 4800 |
| Elong. (%) | 390 | 390 |
| Thickness (inch) | 0.017 | 0.019 |
| After 60 days in H₂O at 158° F. | | |
| Tensile (PSI) | 600 | 5600 |
| Elong. (%) | 90 | 460 |
| After 90 days in H₂O at 158° F. | | |
| Tensile (PSI) | Zero tensile | 5500 |
| Elong. (%) | | 400 |

EXAMPLE VII

A polyurethane prepolymer was prepared by reacting one mole of a polyester derived from the polymerization of ε-caprolactone with diethylene glycol having a molecular weight of about 1250 with two moles of 4,4'-diphenylmethane diisocyanate. The prepolymer was diluted with a mixture of 50 parts methyl ethyl ketone and 50 parts toluene to give a 3 percent NCO content.

A curative mixture was prepared by mixing 8.1 parts 4,4'-methylene bis (2-chloroaniline), 0.5 parts Wing Stay L phenolic antioxidant, a trademark of The Goodyear Tire & Rubber Company, 0.5 parts 2-mercaptobenzothiazole and 15 parts methyl ethyl ketone.

To 100 parts of the diluted prepolymer was mixed (a) 7 parts of a tan pigment and liquid Epon 828 resin dispersion and 7 parts of additional methyl ethyl keton and (b) the curative mixture at about 25° C. to form a polyurethane reaction mixture. The tan pigment-epoxy resin dispersion contained 60 parts by weight tan pigment and 40 parts by weight liquid Epon Resin 828 obtained as X-4213 from Pigment Dispersions, Inc.

Films were drawn from the mixture on a polyethylene slab and allowed to cure at about 25° C. for 48 hours to form tan-colored cured polyurethane films.

Films were also prepared by substituting 10 parts of a tan vinyl acrylic automotive type lacquer for the tan pigment epoxy resin dispersion obtained from the Conchemco Company and generally described in U.S. Pat. No. 3,401,143.

The prepared cured polyutethane films were subjected to long term aging by immersion in water at 158° F. The polyurethane film containing the epoxy resin dispersion retained its rubbery property ven after 90 days, while the film containing the tan vinyl acrylic lacquer lost it rubbery properties as shown in Table 8.

Table 8

| Original | Tan Vinyl/Acrylic Resin | Tan Epoxy Resin |
|---|---|---|
| Tensile (PSI) | 5100 | 3800 |
| Elong. (%) | 430 | 425 |
| Thickness (inch) | 0.022 | 0.027 |
| After 90 days in H₂O at 158° F. | | |
| Tensile (PSI) | 550 | 1600 |
| Elong. (%) | 30 | 420 |

EXAMPLE VIII

A polyurethane prepolymer was prepared by reacting 50 parts tetramethylene adipate having a molecular weight of about 1000 and 50 parts tetramethylene adipate having a molecular weight of about 2000 with about 40 parts of 4,4'-dicyclohexylmethane diisocyanate. The prepolymer was diluted with toluene to a 2.2 percent NCO content.

To 100 parts of the diluted prepolymer was mixed 2 parts of liquid Epon Resin 828 and 20.5 parts of a curative mixture of about 25° C. to form a polyurethane reaction mixture. The curative mixture was prepared by mixing 100 parts isophorone diamine with 400 parts methyl isobutyl ketone and aging for 10 days at 25° C.

Films of the reaction mixture were drawn on polyethylene slabs and allowed to cure at about 25° C. for about 24 hours to form cured polyurethane films. Similarly, relatively clear films were also prepared without the addition of the epoxy resin.

The prepared cured polyurethane films were submitted to long term aging by immersion in water at 158° F. After 60 days the film containing the epoxy resin still showed good rubbery properties while the film without the epoxy resin showed essentially no rubber properties as exhibited in Table 9.

Table 9

| Original | Clear (Without Epoxy Resin) | Epoxy Resin |
|---|---|---|
| Tensile (PSI) | 4400 | 3900 |
| Elong. (%) | 480 | 460 |
| Thickness (Inch) | 0.018 | 0.021 |
| After 60 days in water at 158° F. (measured wet) | | |
| Tensile (PSI) | Deteriorated | 3600 |
| Elong. (%) | | 450 |

EXAMPLE IX

The reaction mixture of Example I is made by mixing the diluted prepolymer of diethylene adipate and tolylene (toluene) diisocyanate, white epoxy dispersion and the 4,4'-methylene bis (2-chloroaniline) curative. The resulting mixture is immediately extruded downward from a filament extruding head and the solvent evaporated to form a continuous filament. The filament is suitable for preparing yarns and threads useful in textile fabrics where an improved resistance to hydrolysis is desired.

Alternatively, thread or continuous filament may be produced by cutting the filament from a large sheet of film.

EXAMPLE X

Into a suitable reactor is placed 100 parts of a polyester prepared by fthe condensation of 1,4-butadne diol with adipic acid. This polyester has a hydroxyl number of approximately 100, and acid number of approximately 0.5, and a molecular weight of approximately 1000. The polyester is heated to 90° C. to liquify the polyester. The liquified polyester is stirred for one hour at 90° C. at a reduced pressure of about 5 to 10 millimeters of mercury absolute. The pressure is then adjusted to atmospheric pressure. Fifteen parts of White 2100 Epoxy Dispersion is added to the polyester. To 5.43 parts of 1,4-butane diol, from which water has been diol, by distilling 10% by weight of the idiol, is added 0.95 parts of 4,4'-diamino diphenyl sulfone. The 4,4'-diamino diphenyl sulfone is dissolved in the 1,4-butane diol at about 50° C. and the resulting solution added to the liquified polyester. The mixture is stirred for 5 minutes until the temperature of the mixture is allowed to reach 80° C. At this time, 39.7 parts of 4,4'-diphenyl methane diisocyanate is added to the stirred mixture. The mixture is stirred for an additional 2 minutes and quickly poured into a pint can, and the pint can covered to maintain an inert atmosphere. The pint can is previously pre-dried by heating to 110° C. The mixture in the pint can is cured by placing it in a hot air over at 140° C. for 3-½ hours.

The cured material is broken into small particles and added to 6 parts of methyl ethyl ketone at about 70° C. After all of the particales are dissolved in the methyl ethyl ketone, the resultant viscous solution is coated onto a glass plate and allowed to dry. The resulting coating has an improved resistance to hydrolysis as determined by immersing in water at 158° F. for 14 days.

A portion of the cured material is extruded through a filament extruding head to form a conftinuous filament suitable for preparing yarns and threads useful in textile fabrics.

Another portion is extruded in solution downward through a filament extruding head and the solvent evaporated to form a continuous filament suitable for preparing yarns and threads useful in textile fabrics.

In the description of this invention, various epoxy resins are described as suitable for use withthe various polyurethane reaction mixtures described in this specification and are suitable for use with the reaction mixtures specifically shown in the Exaples. Although it is usually preferable that the expoxy resins are liquid and pourable at about 25° C. - 30° C. where the cured material is to be used, for example, as at least one wall of a water container, it is typically more desirable to use solid epoxy resins in the preparation of walls for containers for liquid hydrocarbons.

While certain representative embodiments and details have been shown for the purpose of illustrating the invention, it will be apparent to those skilled in this art that various changes and modifications may be made therein without departing from the spirit or scope of the invention.

What is claimed is:

1. A cured polyurethane composition characterized by its tensile strength at 25° C. Being resistant to hydrolysis degradation when immersed in distilled water at 158° F. for 14 days prepared by the method which consists of reacting a polyurethane reaction mixture, containing sufficient diamine curative therefor, in the presence of an excess of an epoxy resin, said method consisting essentially of (A) mixing in a solvent, in order to provide a fluid mixture or solution containing about 40 to about 95 percent solids, selected from benzene, xylene, toluene, acetone, methyl ethyl ketone, methyl isobutyl ketone and diisobutyl ketone (1) an epoxy resin derived from epichlorohydrin and a bis phenol and having an epoxide equivalent in the range of about 150 to about 525, (2) a prepolymer of at least one organic diisocyanate and at least one reactive hydrogen-containing polymeric material havng a molecular weight in the range of from about 700 to about 5,000 selected from polyester polyols, polyether polyols and hydroxyl terminated unsaturated polymeric polyols with a hydroxyl functionality of about 2 to about 3 where the ratio of the diisocyanate of the reactive hydrogens of the reactive hydrogen-containing polymeric material is from about 1.1/1 to about 3.5/1, and (3) a primary diamine curative where the ratio of amino groups of the curative to isocyanato groups in excess of the reactive hydrogens of the reactive hydrogen-containing polymeric material is from about 0.5/1 to about 1.1/1 and where the said polyurethane composition contains from about 2 to about 15 weight percent and at least a sufficient amount to give about a 5 to about a 50 equivalent percent excess of epoxide groups relative to the total excess of said amino groups of the curative over the said isocyanato groups, wherein said epoxy resin in contacted with said primary diamine only at or just prior to preparing said reaction mixture, and (B) substantially simultaneously removing the solvent from the mixture and reacting the prepolymer with the diamine curative in the presence of the epoxy resin at a temperature in the range of about 20° C. to about 100° C.

2. A method of preparing a polyurethane composition having a property of being resistant to hydrolysis degradation by immersion in distilled water at 158° F. for 14 days by reacting a polyurethane reaction mixture, containing sufficient diamine curative therefor, in the presence of an excess of an epoxy resin, said method consisting essentially of (A) mixing in a solvent, in order to provide a fluid mixture or solution containing about 40 to about 95 percent solids, selected from benzene, xylene, toluene, acetone, methyl ethyl ketone, methyl isobutyl ketone and diisobutyl ketone (1) an epoxy resin derived from epichlorohydrin and a bis phenol and having an epoxide equivalent in the range of about 150 to about 525, (2) a prepolymer of at least one organic diisocyanate and at least oen reactive hydrogen-containing polymeric material having a molecular weight in the range of from about 700 to about 5,000 selected from polyester polyols, polyether polyols and hydroxyl terminated unsaturated polymeric polyols with a hydroxyl functionality of about 2 to about 3 where the ratio of the diisocyanate to the reactive hydrogens of the reactive hydrogen-containing polymeric material is from about 1.1/1 to about 3.5/1, and (3) a primary diamine curative where the ratios of amino groups of the curative to isocyanato groups in excess of the reactive hydrogens of the reactive hydrogen-containing polymeric material is from about 0.5/1 to about 1.1/1 and where the said polyurethane composition contains from about 2 to about 15 weight percent and at least a sufficient amount to gibve about a 5 to about a 50 equivalent percent excess of epoxide groups relative to the total excess of said amino groups of the curative over the said isocyanato groups, wherein said epoxy resin is contacted with said primary diamine only at or just prior to preparing said reaction mixture, and (B) substantially simultaneously removing the solvent from the mixture and reacting the prepolymer with the diamine curative in the presence of the epoxy resin at a temperature in the range of about 20° C to about 100° C.

3. The method according to claim 2 where the said diisocyanates are selected from toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene-bis(cyclohexylisocyanate) and 1,5-tetrahydronapthalene diisocyanate, and mixtures of such siisocyanates, the reactive hydrogen containing polymeic material is selected from polyester polyols, polyether polyols, and hydroxyl terminated polymeric polyols selected from polybutadiene polyols, polyisoprene polyols, butadiene-styrene copolymer polyols, and butadiene-acrylonitrile copolymer polyols, the diamine is selected from ethylene diamine, trimethylene diamine, 1,4-cyclohexane bis(methylamine), and tetramethylene diamine; aromatic diamines such as m-phenylene diamine, o- and m-dichlorobenzidiene, 2,5-dichlorophenylene diamine, 3,3'-dichloro-4,4'-diamino-diphenyl methane, dianisidine, 4,4'-diamino-diphenyl methane, the naphthylene diamines, tolylene-2,4-diamine, p-aminobenzyl aniline, and o- and p-aminodiphenylamine, and where the expoxy resin is prepared from epichlorohydrin and 2,2-bis(4-hyddroxyphenol) propane having an epoxide equivalency from about 150 to about 220.

* * * * *